Patented May 5, 1931

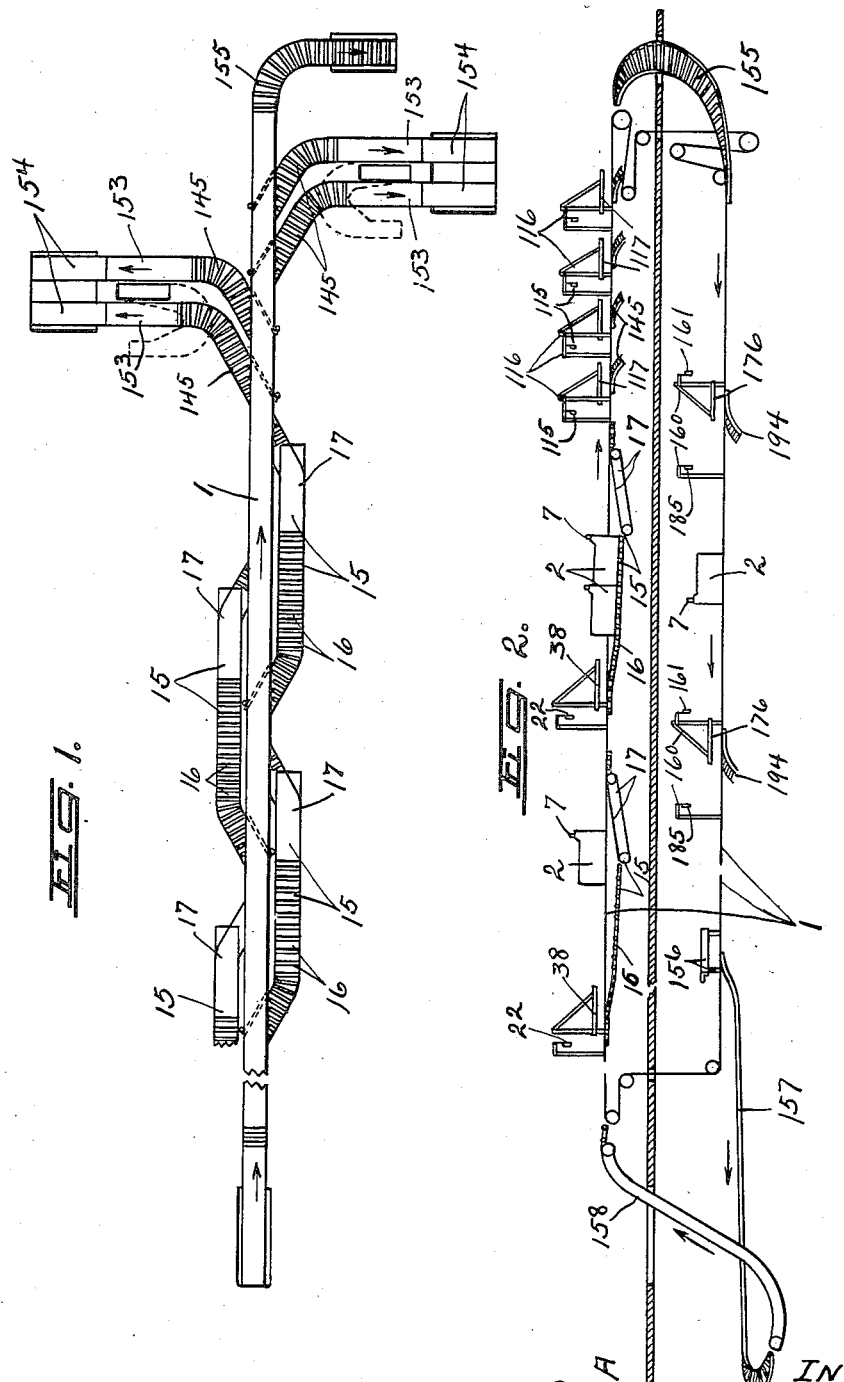

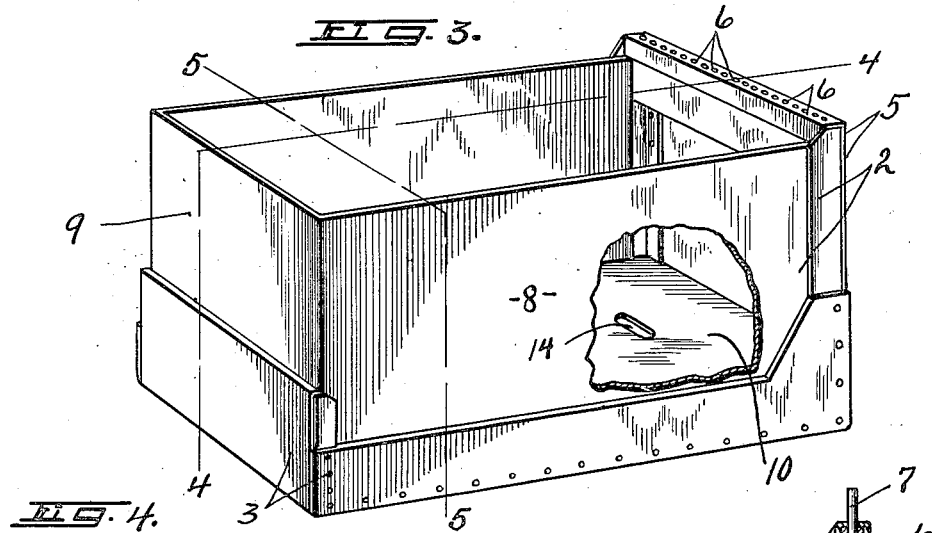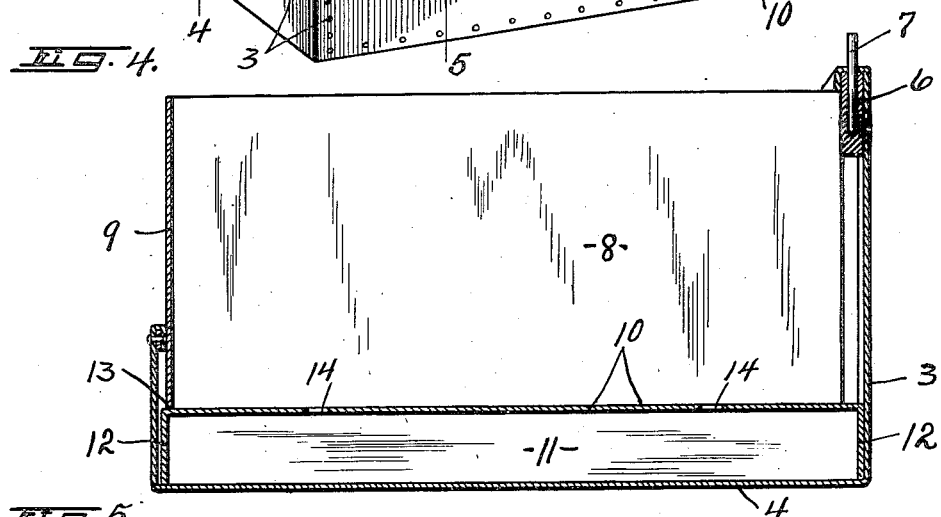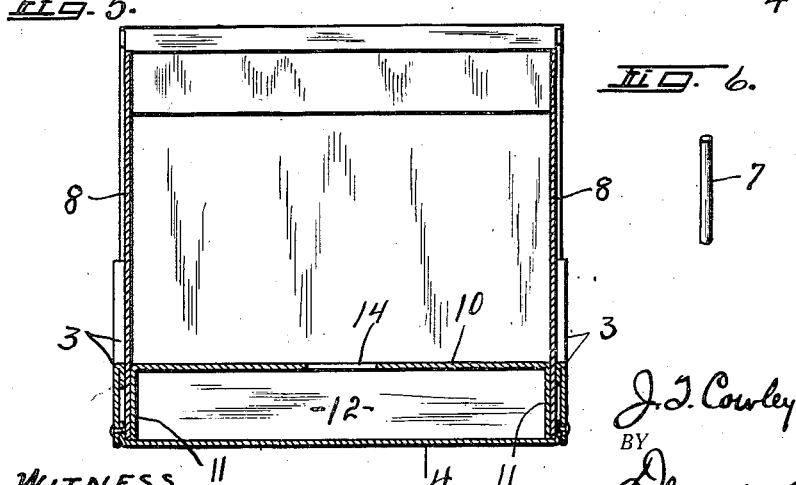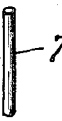

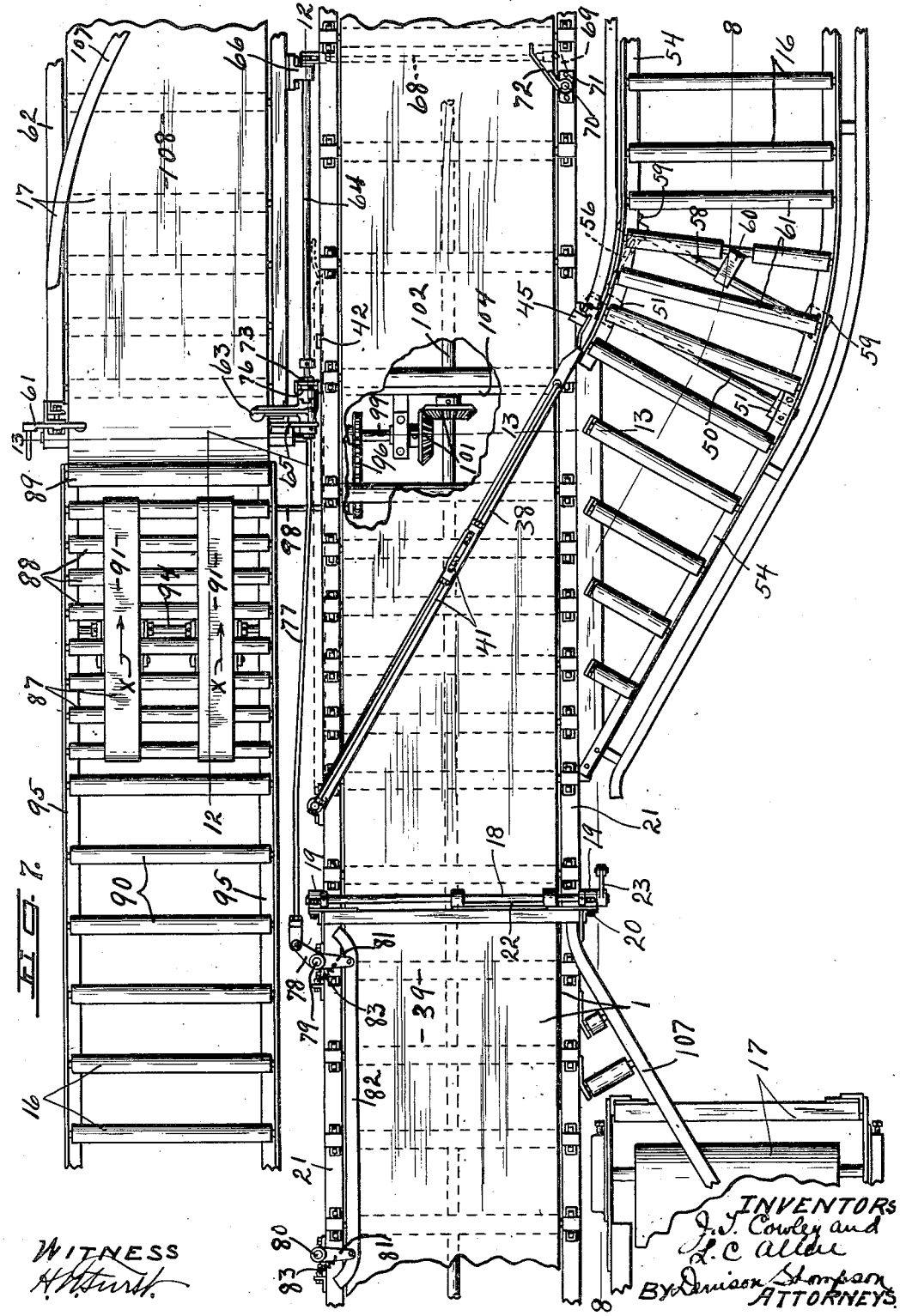

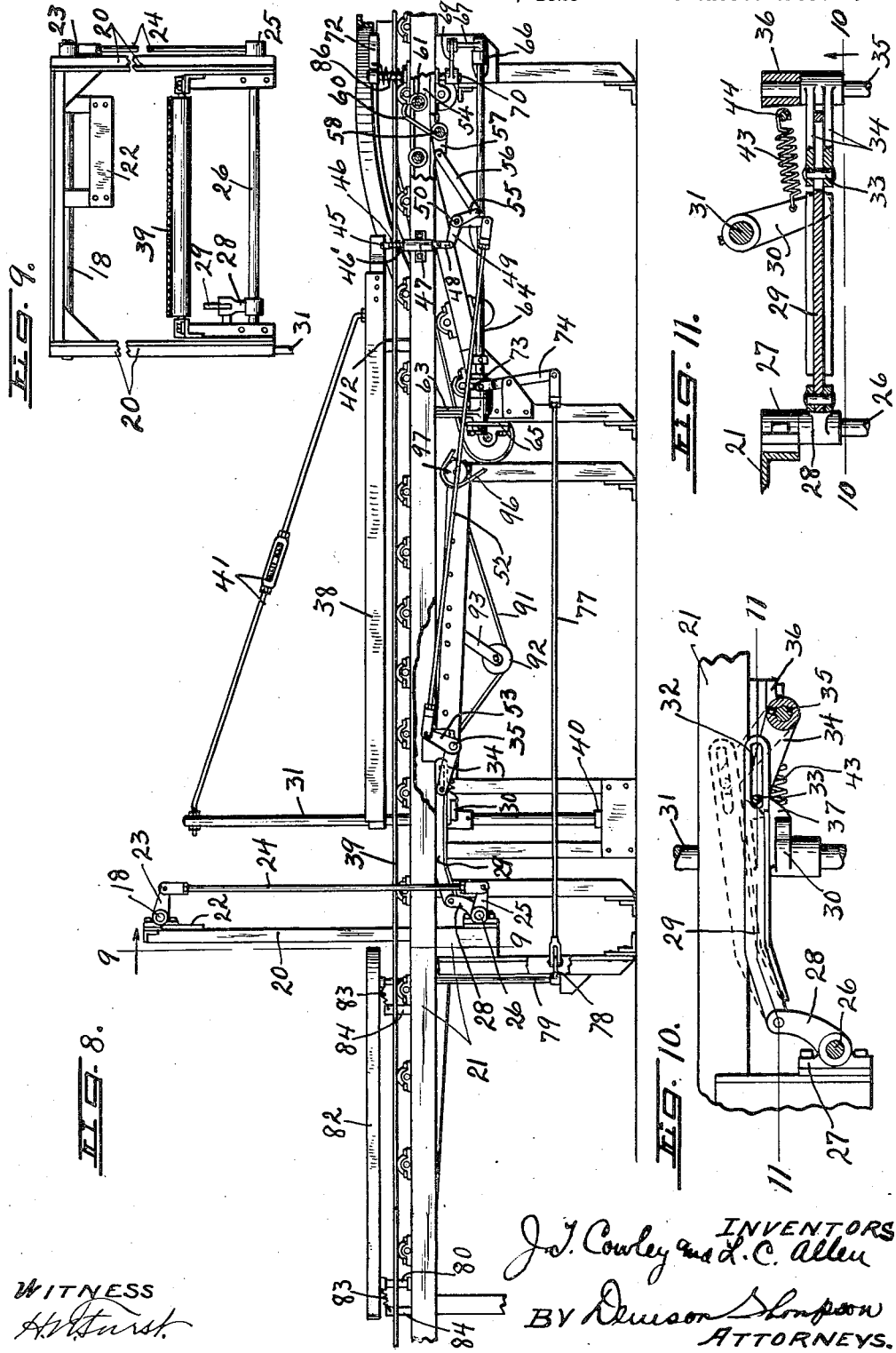

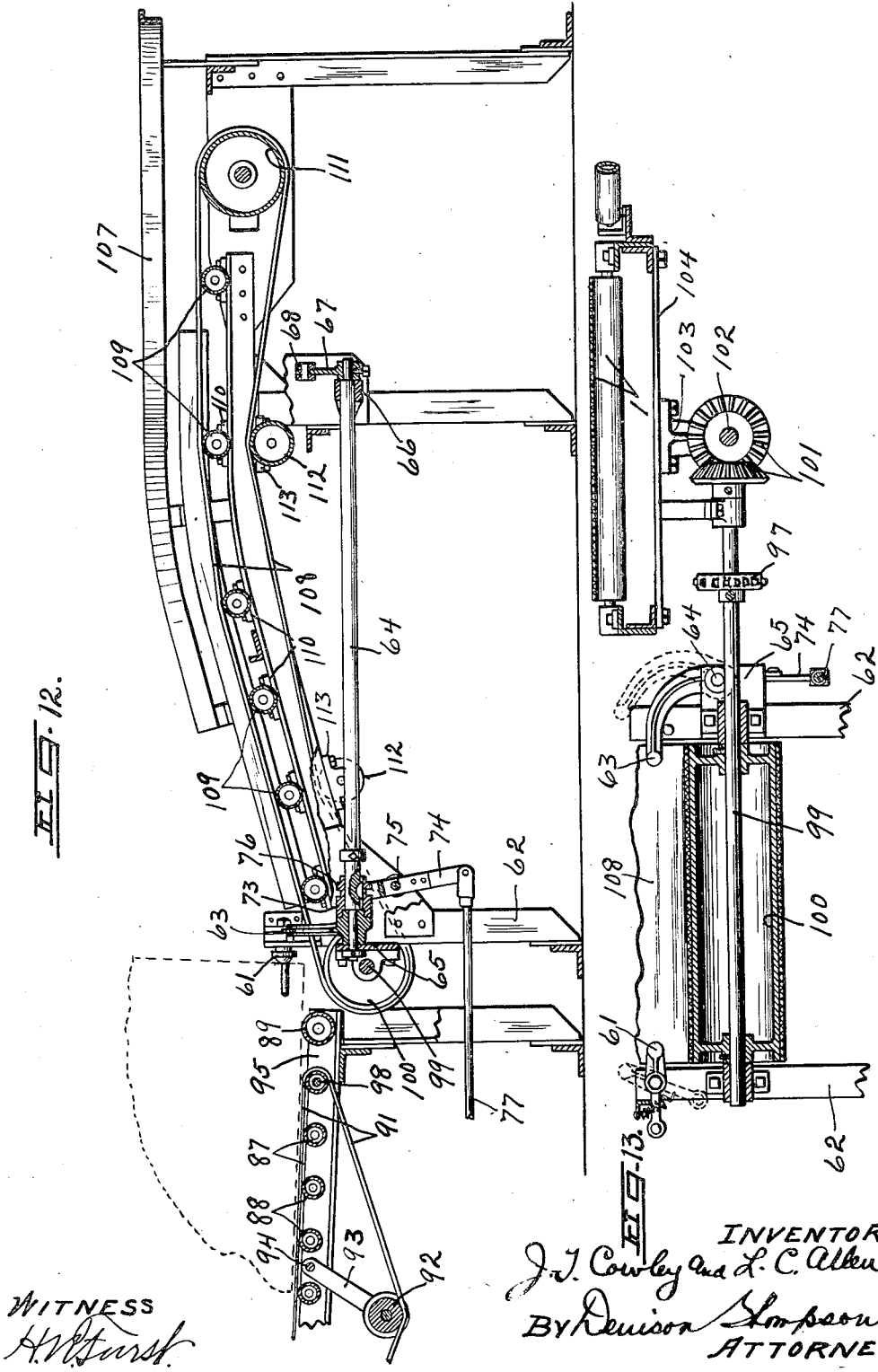

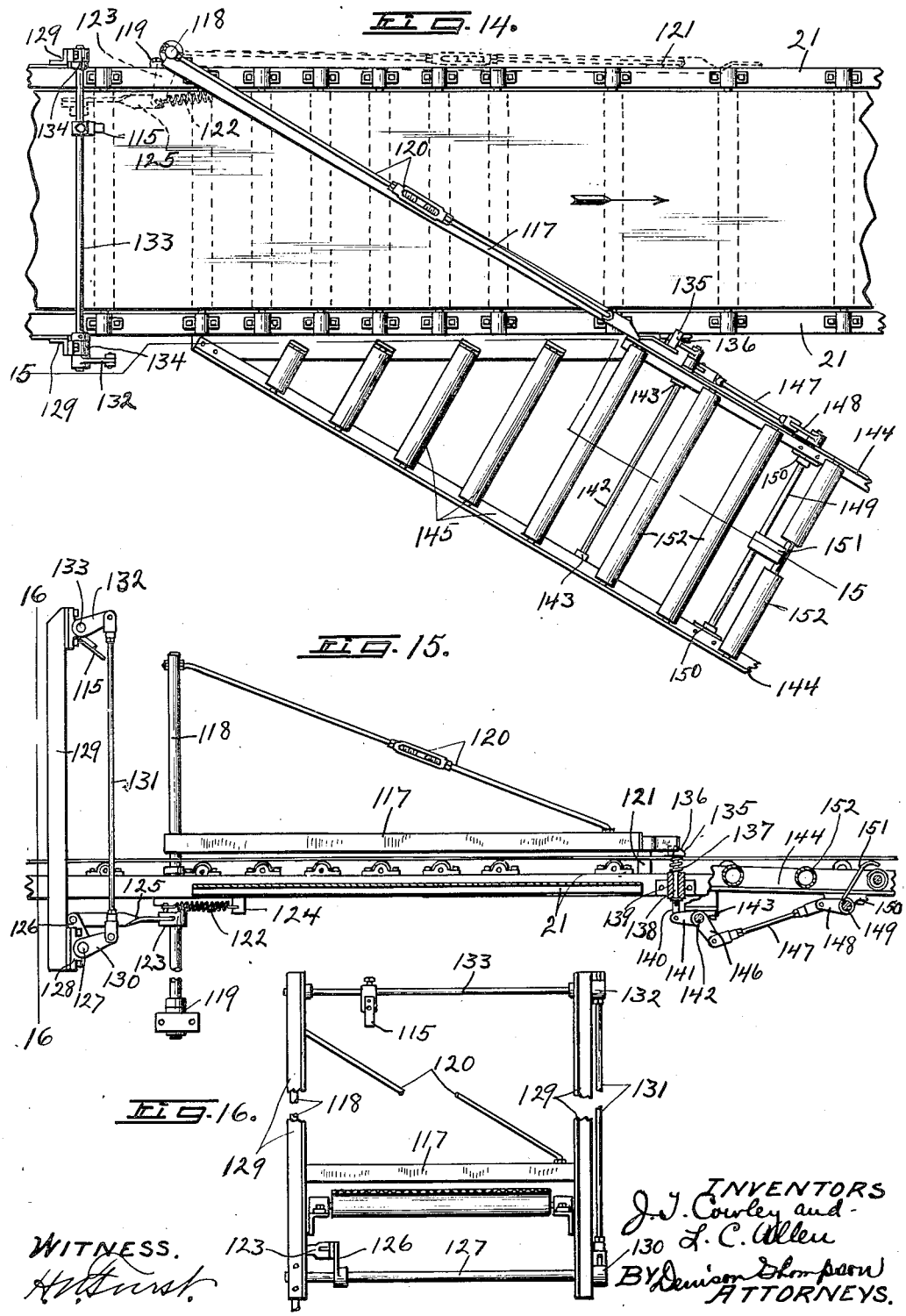

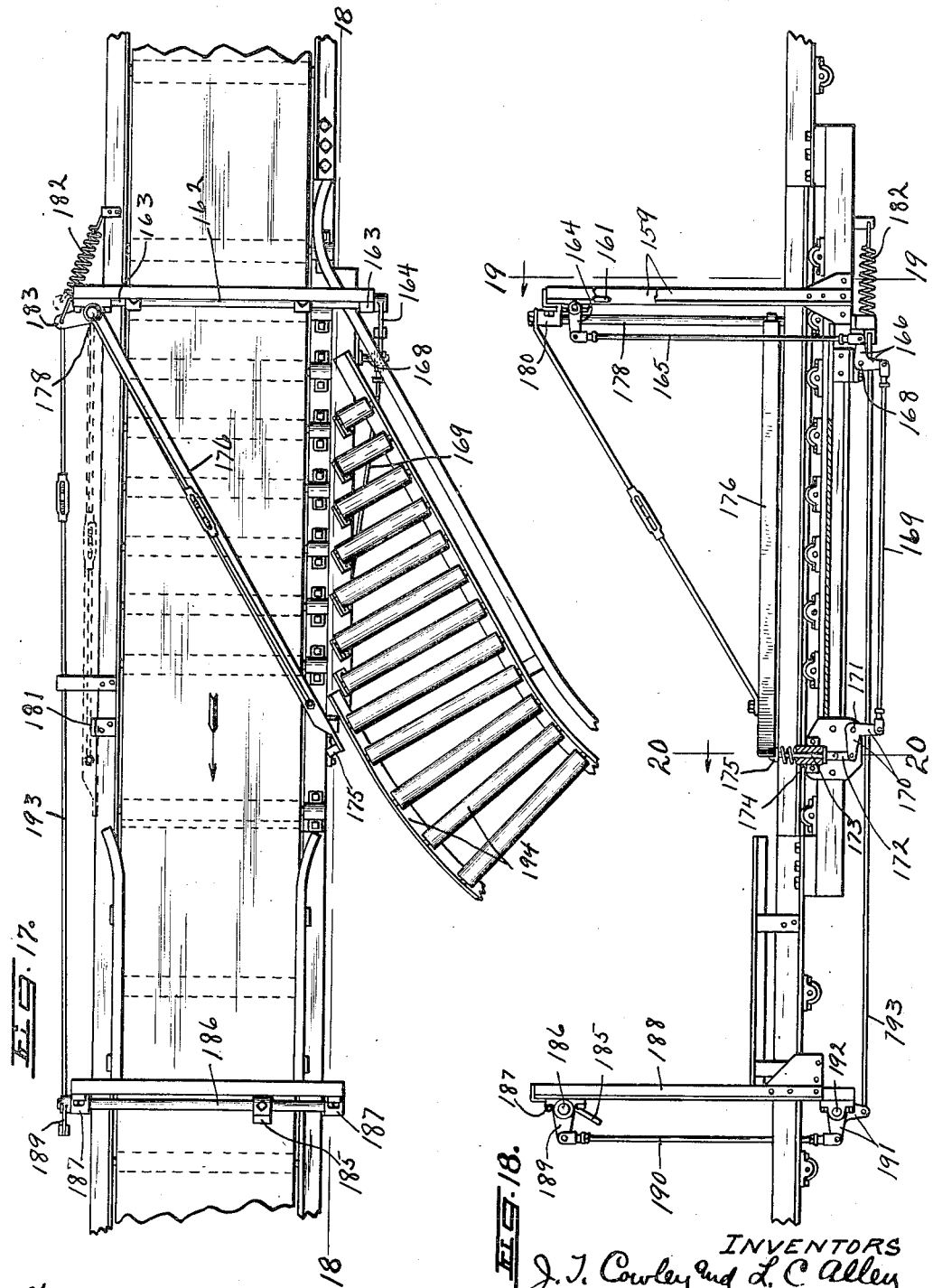

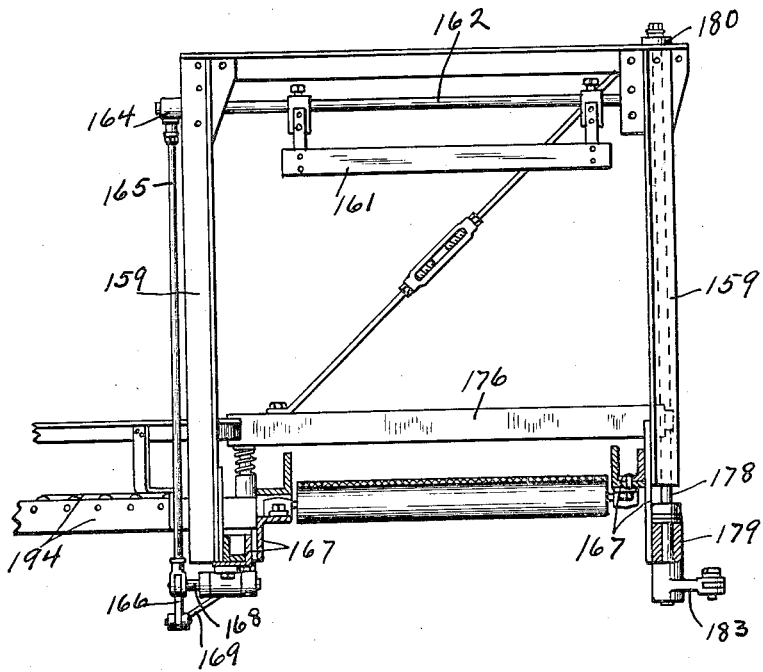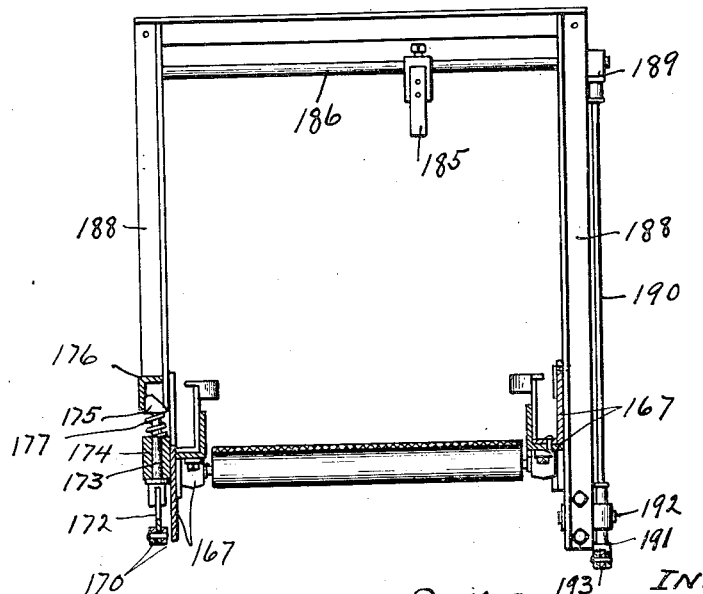

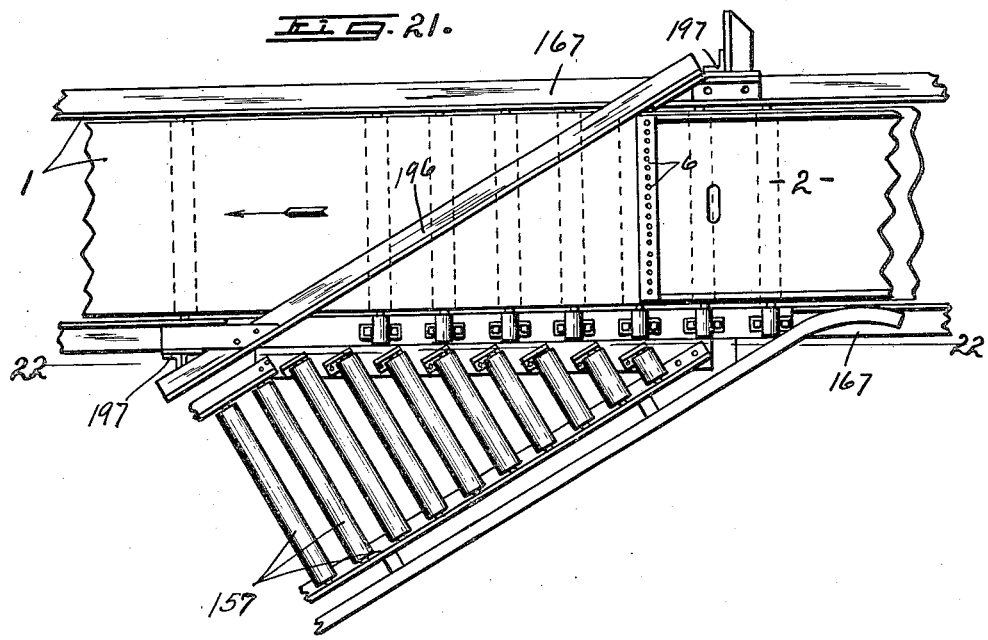
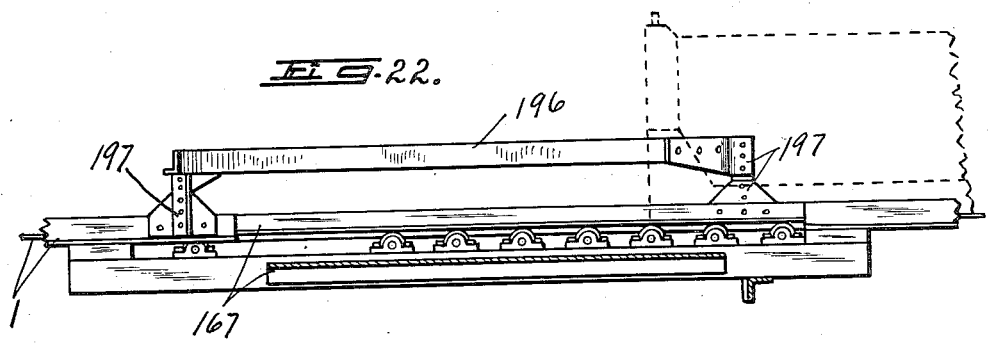

1,804,154

UNITED STATES PATENT OFFICE

JAMES T. COWLEY AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

CONVEYER SYSTEM

Application filed March 5, 1928. Serial No. 259,236.

This invention relates to new and useful improvements in conveyer systems.

An object of this invention is to construct a conveyer system wherein an empty pilot carrier or pilot carriers, provided with means for actuating a deflector, are automatically reflected from a continually moving belt conveyer into the first empty or partially filled station of a plurality of side or dwell stations arranged upon either side of the main conveyer.

Another object is to provide means whereby a pilot carrier, held in any one of the dwell stations, will be automatically released and fed from the dwell station on to the main line conveyer when a vacant space appears upon said conveyer of sufficient size to permit the entrance of the pilot carrier.

A further object is to provide a pilot carrier suitable for carrying articles of merchandise and having a plurality of holes or recesses for receiving a tab-operating pin. Said pin, when placed in a selected hole by a dispatcher, will operate a tab to close a remote single-acting deflector thereby deflecting the pilot carrier with its load onto a spur line where the pilot carrier may be unloaded by an operator.

A still further object is to provide a two-way, continuously moving belt conveyer having a plurality of dwell stations positioned upon either side thereof for a portion of the length of the top run of the conveyer and having a plurality of single acting automatic deflectors positioned along the remaining portion of the top run of said conveyer with a spur conveyer leading from the main conveyer at each of said deflectors and means provided whereby a pilot carrier, when released from any one of the dwell stations and having a tab-operating pin set to operate a deflector leading to a predetermined spur conveyer, will be conveyed to the end of the top run of the two-way feed belt conveyer if said spur conveyer happens to be full of carriers when the approaching carrier reaches the cooperating deflector. Said pilot carrier, upon reaching the end of the top run of the two-way feed belt conveyer, is deposited upon a chute, downward booster or a curved gravity conveyer leading to the lower run of the two-way feed belt conveyer whereupon the pilot carrier is conveyed by the lower run of said belt conveyer to a fixed deflector which deflects the pilot carrier onto a gravity conveyer, thence to an upward booster which in turn, deposits the pilot carrier upon the top run of the two-way feed belt conveyer which, in turn, conveys the pilot carrier past the dwell stations to the selected spur line deflector.

This circulating operation will continue until such time as a vacancy occurs in the selected spur line when the pilot carrier will be automatically deflected on to said spur line.

A still further object is to provide and use a pilot carrier or pilot carriers which may be used to carry articles of merchandise, or, as pilot cars for conveying one or more receptacles, containers, boxes or the like, and which pilot carrier is provided with means for actuating a deflector after the pilot carrier has passed the deflector but before the containers have reached the deflector whereby the container or containers constituting the convoy are deflected from the main conveyer, but the pilot carrier or pilot car continues its journey to the section where there are dwell stations positioned on either side of the main conveyer where the pilot carrier is deflected from said main conveyer into the first empty or partially filled dwell station.

Other objects and advantages relate to the form and relation of the parts, all as will more fully appear from the following description, taken in connection with the accompanying drawings, in which:—

Figure 1 is a diagrammatic drawing of a plan view of a conveyer system embodying the spirit of the invention indicating the form and relation of the top run of a two-way feed belt conveyer together with the location of the dwell stations and the spur conveyers with the deflectors cooperating therewith.

Figure 2 is a diagrammatic drawing in elevation of the conveyer system represented in Figure 1 and indicating the position of the dwell stations, spur conveyers and single-acting deflectors upon the top run of the conveyer and the double-acting and fixed deflectors upon the lower run of the conveyer and how the pilot carriers may be recirculated throughout the entire system.

Figure 3 is a perspective view of a pilot carrier showing the location of the holes or recesses into one of which a tab-operating pin is placed.

Figure 4 is a vertical longitudinal section through the pilot carrier taken in the plane of line 4—4, Figure 3.

Figure 5 is a vertical cross section through the pilot carrier taken in the plane of line 5—5, Figure 3.

Figure 6 is a perspective view of one of the tab-operating pins.

Figure 7 is a plan view of a portion of the upper run of a two-way feed belt conveyer together with portions of adjacent dwell stations with its control mechanism.

Figure 8 is a vertical section taken in the plane of line 8—8, Figure 7.

Figure 9 is a vertical section taken in the plane of line 9—9, Figure 8.

Figure 10 is an enlarged detail vertical section view of the deflector operating arm taken in the plane of line 10—10, Figure 11.

Figure 11 is a detail horizontal section taken in the plane of line 11—11, Figure 10.

Figure 12 is a vertical section taken in the plane of line 12—12, Figure 7, showing the automatic stop lever and clutch-operating mechanism.

Figure 13 is a vertical cross section taken in the plane of line 13—13, Figure 7.

Figure 14 is a plan view of a portion of the top run of a two-way feed belt conveyer together with a single-acting automatic deflector.

Figure 15 is a vertical longitudinal section of the single-acting automatic deflector taken in the plane of line 15—15, Figure 14.

Figure 16 is a vertical cross section, taken in the plane of line 16—16, Figure 15.

Figure 17 is a top plan of the lower run of a two-way feed belt conveyer together with a double-acting automatic deflector in position.

Figure 18 is a longitudinal vertical section taken in the plane of line 18—18, Figure 17.

Figure 19 is a vertical cross section taken in the plane of line 19—19, Figure 18, showing the deflector release-operating tab.

Figure 20 is a vertical cross section taken in the plane of line 20—20, Figure 18, showing the deflector bar locking latch and the deflector bar engaged therewith, also the pin-actuated tab for operating the deflector bar.

Figure 21 is a top plan of a portion of the lower run of a two-way feed belt conveyer showing a fixed deflector together with a portion of the gravity conveyer leading therefrom with a pilot carrier about to engage the deflector bar.

Figure 22 is a longitudinal vertical section, taken in the plane of line 22—22, Figure 21.

In Figures 1 and 2 are shown diagrammatic views of a conveyer system embodying the various features of this invention, wherein —A— represents a floor in a building in which this conveyer system may be installed.

The top and lower run of a two-way feed belt conveyer —1— may be located in any suitable manner, such as by securing the top run of said conveyer near the floor —A— of a given room for the convenience of loading and unloading the pilot carriers —2—, while the foot end of the belt may be run over suitable guides or pulleys and down through an opening in the floor —A— to return near the ceiling of the room below thereby giving ample space for any spur gravity conveyers leading therefrom.

The lower run of the belt conveyer continues to near the head end of the conveyer where it is passed over suitable pulleys and up through an opening in the floor —A— to the top run. The belt conveyer may be driven in any suitable manner, as by an electric motor (not shown) connected to a shaft and pulley (also not shown) located at the head end of the belt conveyer.

The pilot carrier —2—, to be used in connection with this conveyer system, may be used to carry articles of merchandise placed in said carrier, or may be used as a pilot car to convoy a single package, a crate or box of packed merchandise, or a train of packages or crates of merchandise which may be placed on the belt conveyer behind the pilot carrier, from one locality to a predetermined spur gravity conveyer located at a remote place along the conveyer. The convoy of merchandise is deflected from the main conveyer by a deflector bar which has been closed by a tab-operating pin carried by the pilot carrier after the pilot carrier or, in this instance, pilot car has passed ahead of the deflector, but before the merchandise has reached said deflector.

The pilot carrier —2— may be made in any suitable manner and may consist of, as in this instance, a substantially built frame —3—, rectangular in plan view having a tight, smooth bottom —4— composed of sheet metal or the like, and a vertical upright frame —5— across the forward end thereof, said upright frame —5— being of slightly greater height than the tallest crate, box or container to be carried or piloted by the pilot carrier and having a series of holes or recesses —6— arranged in the upper surface thereof for the purpose of receiving a tab-operating pin —7—.

A collapsible frame consisting of side walls

—8— and a rear end wall —9— preferably made of a light, tough material such as fibre or cardboard, is placed within the carrier frame and having the side walls —8— resting upon the bottom —4— and extending upward therefrom to within a short distance of the top of the end frame —5— while a false bottom —10— composed of fibre or the like and having vertical downwardly turned sides —11— and —12— is positioned upon the bottom —4— of the carrier beneath a recess —13— in the lower edge of the end wall —9— and between the side walls —8—.

The false bottom is held in place by the rear wall —9— resting upon the bottom —10— and the side flanges —11— and the bottom —10— holds the sides —8— in their proper position against the side frames —3— of the carrier. The false bottom —10— is also provided with hand holes or elongated slots —14— positioned one near each end thereof to facilitate the assembly and removal of said bottom.

The tab-operating pin —7— may be of any convenient construction, such as circular in cross section and of slightly less diameter than the holes —6—, so as to permit of easy placement therein, and of sufficient length to extend a short distance above the upper surface of the front end of the pilot carrier —2— to operate a co-acting deflector operating tab.

As the pilot carrier —2— is being conveyed along the system by the upper run of the two-way feed belt conveyer —1— it will approach one of several side or dwell stations —15— which consist of a gravity conveyer —16— leading at an angle from the top run of the conveyer —1— and curving so as to be spaced a short distance from and running parallel to the conveyer —1— a sufficient distance to permit a given number of, in this instance three, pilot carriers to rest thereon at a time. At the forward end of the gravity conveyer —16— is positioned an upward continually moving feed belt conveyer —17—.

The dwell stations —15— may be positioned on both sides of the belt conveyer —1— and preferably in staggered relation to each other so that as the pilot carrier —2— is being carried forward by the conveyer —1—, said carrier will first come in contact with a deflector operating mechanism for a station on one side of the main conveyer and then for a station on the opposite side.

The deflector operating mechanisms located at each of the dwell stations consists of, in this instance, a horizontal rock shaft —18— mounted in suitable bearings —19— located near the ends thereof and secured to the upper ends of two vertical supports —20— secured at their lower ends to the conveyer frame —21— one on either side thereof a short distance to the rear of their respective dwell stations.

A pin-actuated tab —22— is secured to the rock shaft —18— between the bearings —19—, said tab having its lower edge high enough above the top run of the conveyer to permit the free passage of the pilot carrier beneath it, but low enough to be in the path of a pin placed in one of the holes —6— positioned in the upper edge of the front end of the pilot carrier —2— while said tab extends longitudinally from a position approximately over the longitudinal center line of the top run of the conveyer to the right side thereof so as to be in the path of a pin —7— carried in any one of the holes —6— at the right of the vertical longitudinal center line of the pilot carrier.

A radial arm —23— is secured to the outer end of the rock shaft —18— located on the opposite side of the conveyer to which the deflector bar supporting shaft is located.

A connecting rod —24— connects the radial arm —23— to a second radial arm —25— secured to the outer end of a horizontal rock shaft —26— located under the top run of the conveyer and mounted in suitable bearings —27— secured to either side of the conveyer frame —21— while a radial arm —28— is secured to the shaft —26— between the bearings —27— and near the opposite end of said shaft to which the radial arm —25— is secured. To the outer end of the radial arm —28— is pivoted one end of a deflector operating lever —29— which extends forwardly over a deflector operating arm —30— secured to the deflector supporting shaft —31— while the opposite end of the deflector operating lever —29— is provided with an elongated slot —32— through which a pin —33— mounted in the outer end of a bifurcated rock arm —34— passes, said rock arm —34— being secured to a longitudinal rock shaft —35— journaled in suitable bearings —36— secured to the underside of the conveyer frame —21—.

To the underside of the lever —29— is secured a pawl —37— which normally engages the deflector operating arm —30— to rock the deflector supporting shaft —31— and thereby swing the deflector bar —38— across the conveyer belt from the open to the closed position.

The deflector bar —38— consists, in this instance, of an angle iron with the vertical flat side facing the inner portion of the conveyer and positioned a short distance above the conveyer belt —39— and having one end thereof secured to the vertical rock shaft —31— journaled at its lower end in suitable bearings —40— secured to the conveyer frame —21— while the opposite end extends forwardly a sufficient distance to reach across the conveyer at an angle thereto when in its closed position, and is supported by a tire rod —41— having one end fastened near the forward end of said deflector bar and the other end secured to the upper end of the rock shaft —31— which extends some distance above the deflector bar —38—.

The deflector bar —38— is held in its normal open position against a stop bar —42— located near the forward end thereof and secured to the conveyer frame —21— by a retracting spring —43— having one end secured to the arm —30— and the other end fastened to a pin —44— secured to the conveyer frame —21— while the deflector bar —38— is locked in its closed position by a lock latch —45— positioned on the opposite side of the conveyer and having a latch stem —46— slidably mounted in a supporting member —47— secured to the conveyer frame —21—.

The lower end of the latch stem —46— is connected by a link —48— to one arm of a bell-crank lever —49— secured to a rock shaft —50— journaled in bearings —51— secured to the under surface of the conveyer frame —54— of the dwell station. The other arm of the bell-crank-lever —49— is connected by a rod —52— to a rock arm —53— secured to the rock shaft —35—. A rock arm —55— is also rigidly mounted to the rock shaft —50— and is connected by a link —56— to a rock arm —57— secured to a horizontal rock shaft —58— journaled in bearings —59— secured to the under surface of the dwell station conveyer frame —54—.

A latch trigger —60— positioned in the vertical plane of the center line of the dwell station has one end secured to the rock shaft —58— while the other end extends upwardly between the adjacent gravity rollers —61— into the path of an object passing over said gravity rollers.

It may now be understood that a pilot carrier having a pin —7— previously placed in any one of the holes —6— at the right of the longitudinal vertical center line thereof will, upon approaching the entrance to the first dwell station, move the deflector bar —38— across the conveyer from the open to the closed position by the pin coming in contact with the deflector tab —22— thereby rocking the shaft —18— which, in turn, imparts a similar movement to the rock shaft —26— through the medium of the arm —23—, rod —24— and arm —25—.

This rocking movement of the shaft —26— moves the arm —28— and the lever —29— pivoted thereto rearwardly sufficiently to move the deflector bar —38— obliquely across the conveyer by the pawl —37— engaging the arm —38— and swinging it rearwardly thereby rotating the deflector shaft —31—. As the forward end of the deflector bar —38— passes over the latch member —45—, said latch is depressed against the action of the spring —46'— which returns the latch to its normal up-position as soon as the deflector bar has passed beyond the latch —45—, thereby locking the deflector bar in its closed position so that, as the pilot carrier —2— comes in contact with the deflector bar as it is carried forwardly by the conveyer, said pilot carrier will be deflected from the conveyer onto the gravity conveyer leading to the respective dwell stations.

As the pilot carrier gravitates forwardly, the bottom thereof will come in contact with the latch trigger —60— forcing the upward end downwardly and thereby drawing the latch —45— downwardly out of the path of the deflector bar —38— permitting the retracting spring —43— to return said deflector bar to its normal open position while the pilot carrier continues its travel down the gravity conveyer —16— to the forward end thereof where it is brought to an "at-rest" position by a manually-operated stop member —61'— pivotally connected to the outer frame work —62— of the dwell station.

The next pilot carrier having a pin —7— positioned in one of the holes —6— located at the right of the longitudinal vertical center line thereof being conveyed along the top run of the conveyer will follow the preceding pilot carrier and this will continue until this particular dwell station is filled with pilot carriers when the last pilot carrier to enter the dwell station will rest upon the latch trigger —60— holding it down, and thereby holding the latch —45— down below the path of travel of the deflector bar —38—. At the same time the rod —52— and arm —53— will be moved forward, rocking the arm —34— upwardly, which, in turn, lifts the forward end of the lever —29— upwardly sufficiently to disengage the latch member —37— from the arm —30— with the result that all succeeding pilot carriers passing the filled dwell station will actuate the deflector tab —22— and lever —29— cooperating therewith without moving the arm —30— or deflector bar —38— from the open position thus leaving a clear and free passage for the pilot carrier to continue along the conveyer to the next vacant, or partially filled, dwell station into which it will be diverted in the same manner as explained for the first dwell station.

The pilot carrier resting in the dwell stations may be used for any convenient purpose such as to receive small packages or parcels of merchandise prepared for shipment and, as soon as the pilot carrier resting against the hand-operated stop —61'—, as illustrated by dotted lines, Figure 12, has received its load, the operator resets the tab-operating pin —7— into one of the holes —6— located at the left of the vertical longitudinal center line of the pilot carrier to operate a predetermined deflector located at one of several remote spur conveyer lines.

The operator then trips the stop lever —61'— by moving the outer end thereof downwardly, thus releasing the pilot carrier and permitting it to gravitate to the automatic release stop —63— by which said pilot carrier is held until a vacant space occurs on the two-way feed belt conveyer between two carriers, when it is released and fed onto said conveyer.

The automatic release stop arm —63— is pivotally mounted on a horizontal rock shaft —64— near the rear end thereof and extends upwardly and inwardly over the continually moving belt conveyer —17— and positioned a short distance ahead of the stop member —61—.

The rock shaft —64— is positioned at the inner side of the dwell station and has its rear end journaled in a bearing —65— secured to the frame —62— of the dwell station near the foot end of the belt conveyer —17— while said rock shaft is journaled near its forward end in a bearing —66—, also secured to the frame —62—.

A radial arm —67— is secured to the forward end of the rock shaft —64— and is connected by a rod —68— to a second radial arm —69— secured to the lower end of a vertical rock shaft —70— journaled in a suitable bearing —71— secured to and located at the opposite side of the conveyer —1— from the shaft —64—. To the upper end of the shaft —70— is secured a horizontal tab —72— having its free end extending obliquely over the conveyer belt so as to be in the path of each pilot carrier as it is carried along by the conveyer.

A clutch member —73— positioned just ahead of the release stop —63— and splined to the rock shaft —64— has radial teeth in the rear face thereof which coact with corresponding grooves in the front face of the hub of the release stop lever —63— to rotate said stop lever to move it out of the path of the adjacent pilot carrier. The clutch member —73— is moved into and out of engagement with the release stop —63— by a rock arm —74— pivotally connected at —75— to the frame —62— and having its upper end divided to form two upwardly extending arms with inwardly projecting pins in the outer ends thereof to project into and coact with the sides of an annular groove —76— in the clutch member —73—, while the lower end of the lever —74— is connected by a rod —77— to one end of a radial arm —78— secured to the lower end of a vertical rock shaft —79— which is pivotally connected to the frame —21— of the two-way feed belt conveyer.

A second vertical rock shaft —80— is positioned some distance to the rear of the rock shaft —79— and pivotally connected to the frame —21—. These two vertical shafts —70— and —80— have their upper ends extended a short distance above the conveyer belt and have secured thereto radial arms —81— which are pivotally connected at their outer ends to an elongated horizontal release guide rail —82— positioned a short distance above the conveyer belt and extending inwardly a sufficient distance to be in the path of a passing pilot carrier.

The release guide rail —82— is of sufficient length to be always in contact with a passing pilot carrier when said pilot carriers are spaced a predetermined distance apart upon the conveyer belt. In other words, the first pilot carrier passing along the conveyer will come in contact with the release guide rail and carry it forwardly and outwardly about the vertical rock shafts —79— and —80— and be held in this position as long as the pilot carriers continue to pass in their regular order, but if a vacancy should occur in the line of pilot carriers the release guide rail will be returned to its normal position by retracting springs —83— having one end thereof connected to the radial arms —80— and —81— respectively and the other end fastened to vertical posts —84— secured at their lower ends to the frame —21—.

This forward radial movement of the release guide rail —82— rocks the shaft —79— and transmits a rearward horizontal movement to the rod —77— and carries the lower end of the arm —74— rearwardly, thus forcing the clutch member —73— out of engagement with the automatic release stop —63—.

It is now evident that with the clutch member —73— held in its disengaged position that the release stop lever —63— will be uneffected by any rotary movement of the shaft —64— caused by a pilot carrier passing the horizontal tab —69— and rocking it outwardly, thus producing a longitudinal movement of the rod —68— and a radial movement to the arm —67— which, in turn, is secured to the shaft —64—. But, as soon as a vacancy occurs in the line of pilot carriers permitting the release guide rail —82— to return to its normal position and the clutch member —73— to thereby engage the release stop —63—, the lateral movement of the tab —72— caused by the passing of the last pilot carrier will rotate the shaft —64— sufficiently to rock the release stop —63— upwardly out of the path of the adjacent pilot carrier and permit it to gravitate forwardly onto the continually moving inclined belt conveyer —17—.

The automatic release stop —63— and the tab member —72— are returned to their normal positions by a retracting spring —86— coiled about the vertical shaft —70— as soon as the pilot carriers engaging therewith have moved forwardly sufficiently to be out of contact with said release stop and tab member. At or near the lower forward end of the gravity conveyer section —16— of each dwell station is located an automatic feed —87— which consists of a plurality of gravity rollers —88— positioned at the rear of the forward end roller —89— having their axes in the same plane with said end roller and the remaining gravity rollers —90— of said gravity conveyer, but of less diameter so that the top surfaces of the endless feed belts —91— operating thereon are slightly below the top plane of the rollers —89— and —90—.

The feed belts —91— may consists of, as in this instance, two relatively narrow belts operating in spaced relation upon the gravity rollers —88— and the idler or take-up rollers —92— rotatably connected to the lower ends of supporting arms —93— which are, in turn, pivotally mounted at the opposite ends on a horizontal shaft —94— secured at its ends to the side frame —95— of the gravity conveyer —16— beneath the rollers —88— of the automatic feed —87—.

The feed belts —91— are driven forwardly over the top of the rollers —88— in the direction of the arrows —x—, Figure 7, by a chain —96— and sprockets —97— one of which is secured to one end of a horizontal shaft —98— upon the other end of which is mounted the forward roller —88— of the automatic feed —87— while the other sprocket is secured to the horizontal shaft —99— between the drive roller —100— of the inclined feed belt conveyer —17— secured to one end of said shaft and one of a pair of bevel gears —101— secured to the opposite end thereof while the remaining bevel gear is secured to and driven by a horizontal shaft —102— which is mounted in suitable bearings —103— secured to cross bars —104— secured in spaced relation to the underside of the conveyer frame —21—.

The horizontal drive shaft —102— is common to all the dwell stations and may, as in this instance, be positioned beneath the top run of two-way feed belt conveyer —1— and may extend approximately the entire length of the dwell station section and be driven from an electric motor by a belt and pulley (not shown).

As the pilot carrier —2— is brought to an "at-rest" position by either the stop —61— or the automatic release stop —63—, the forward end of the bottom of the carrier will rest upon the forward end roller —89— while the rear end of the bottom will rest upon one or more of the forward rollers —90— thus positioning the pilot carrier in a plane slightly above the top of the feed belts —91— with the result that said feed belts move freely without coming in contact with the pilot carrier but, upon said carrier being released by the moving of the automatic release stop —63— out of the path thereof permitting the carrier to gravitate forwardly a short distance when the rear end thereof will pass from the forward roller —90— onto the feed belts —91— which will then feed the pilot carrier forwardly with a smooth even movement onto the inclined belt conveyer —17— which, in turn, carries the pilot carrier forward to be diverted by a stationary deflector bar —107— positioned diagonally across the forward end of the conveyer —17— onto the top run of the two-way feed belt conveyer —1—.

The inclined belt conveyer consists of, in this instance, an endless belt —108— which travels about and is driven forwardly by the driven roller —100— up an inclined plane over guide rollers —109— journaled in suitable bearings —110— secured to the side frames —62— and about a take-up roller —111— in the horizontal plane of the conveyer —1— to return to the drive roller —100— over guide rollers —112— journaled in suitable bearings —113— secured to the side frames —62—.

As the loaded pilot carrier leaves its particular dwell station it is carried forwardly by the top run of the two-way feed belt conveyer —1— until the pin —7—, which has previously been placed in one of the holes —6— at the left of the longitudinal vertical center line of the pilot carrier to operate a predetermined deflector, comes in contact with the deflector actuating tab —115—, Figures 14, 15 and 16, located at the selected one of a number of single-acting stations —116— located on the top run of the two-way feed belt conveyer —1— near the forward end thereof.

The single-acting deflectors —116— consist of a deflector bar —117— secured at one end to a vertical rock shaft —118— positioned at one side of the feed belt conveyer —1— and journaled in suitable bearings —119— secured to the conveyer frame —21—.

The deflector bar —117— is held in a plane a short distance above the top run of the feed belt conveyer —1— while the vertical shaft —118— extends some distance above said deflector bar and has one end of a supporting rod —120— secured near the upper end thereof while the other end of the rod —120— is connected to the deflector bar —117— near its outward free end.

The deflector bar —117— is held in its open position parallel with the conveyer —1— against a stop bar —121— secured to the frame —21— by a retracting spring —122— having one end fastened to a radial arm —123— secured to the vertical shaft —118— beneath the conveyer frame —21— while the other end of the spring is connected to an arm —124— secured to the conveyer frame —21—.

A link —125— connects the radial arm —123— with a rock arm —126— mounted on a horizontal rock shaft —127— journaled in suitable bearings —128— secured to the lower ends of two vertical supports —129— which are secured to the side frames —21— of the conveyer and extend upwardly some distance above said conveyer. A radial arm —130— secured to the outer end of the horizontal shaft —127— is connected by a rod —131— to a second radial arm —132— secured to the outer end of horizontal rock shaft —133— journaled in bearings —134— secured to the upper end of the upright supporting members —129—.

The deflector actuating tab —115— is secured to the rock shaft —133— between the bearings —134— and high enough above the conveyer belt to permit the free passage of the pilot carrier beneath said tab but low enough to be in the path of a tab-operating pin —7— carried by the pilot carrier.

As the lower end of the tab —115— is carried forwardly by pin —7— a rocking movement will be imparted to the shaft —133— thence to the rock shaft —127— through the medium of the radial arms —132— and —130— and the rod —131—. This rocking movement of the shaft —127— will rock the vertical shaft —118— through the medium of the radial arms —126— and —123— and link —125— sufficiently to swing the deflector bar —117— from the open position obliquely across the conveyer to the closed position in which position it is locked by the latch —135— and thereby divert the pilot carrier from the conveyer onto the spur conveyer —145—.

The latch —135— is composed of a rectangular shaped head —136— having the top surface thereof sloping downwardly toward the longitudinal center line of the conveyer —1— and positioned in the path of deflector bar —117— so that, as said deflector bar is moved across the conveyer, the lower edge of the deflector bar will engage the top surface of the latch head and force it downwardly against the action of a spring —137— coiled about the latch shank —138— and positioned between the head —136— and the supporting bearings —139— which is secured to the adjacent conveyer frame —21—.

The latch shank —138— is slidably mounted in the bearing —139— and has one end of a link —140— pivotally connected to the lower end thereof while the other end of the link —140— is pivotally connected to the outer end of a radial arm —141— which is secured to a rock shaft —142— journaled in suitable bearings —143— secured to the under surface frame work —144— of a spur gravity conveyer —145—. A second radial arm —146— secured to the shaft —142— is connected by a link —147— to a radial arm —148— secured to one end of a horizontal rock shaft —149— journaled in suitable bearings —150— secured to the under surface of the spur gravity conveyer frame —145—.

The horizontal rock shaft —149— extends across the spur conveyer —145— and has a latch trip arm —151— secured thereto midway between the side frames —144—. Said latch trip arm extends upwardly between the gravity rollers —152— of the spur conveyer a sufficient distance to be in the path of a pilot carrier as it gravitates along the spur conveyer —145— and is carried forwardly and downwardly, imparting a rotary movement to the shaft —149—, and thereby pulls the latch —135— downwardly out of the path of movement of the deflector bar —117— through the medium of the radial arm —148—, rod —147—, the arms —146— and —141—, and link —140—, thereby permitting the retracting spring —122— to return the deflector bar —117— to its normal open position against the stop —121—.

The pilot carrier continues its travel along the spur gravity conveyer —145— to a substantially level horizontal portion —153— of the spur conveyer, Figure 1, where the carrier will come to an "at-rest" position, permitting an operator to remove the articles from the carrier for future consideration after which the operator places the pilot carrier on a downward chute —154— to pass to the room below where a workman may reset the pin —7— into one of the holes —6— at the right of the longitudinal vertical center line of the empty pilot carrier and place it at will upon the bottom run of the two-way feed belt conveyer —1— to be returned to the top run of said conveyer and into the first empty or partially filled dwell station in a manner previously explained.

If, however, the particular spur conveyer —145— to which the pilot carrier has been directed should be filled with pilot carriers so that the rear carrier remains at rest upon the latch trip arm —151— the latch —135— will be held in its down position below the path of movement of the deflector bar —117— permitting said deflector bar to be returned to the normal open position by the spring —122— as soon as the pin —7— carried by the approaching carrier has passed the deflector operating tab —115— thus permitting the pilot carrier to continue its travel along the top run of the two-way feed belt conveyer —1— to the foot end thereof where it will be deposited upon a curved downward conveyer —155— which in turn deposits the carrier upon the lower run of the two-way feed belt conveyer —1— which conveys the carrier to a fixed deflector —156— positioned near the forward end of the lower run of the conveyer —1— where the carrier is diverted to a gravity conveyer —157— which, in turn, deposits it upon an upward booster —158— and thence to the top run of the two-way feed belt conveyer —1—.

As the pin —7— is carried on the opposite side of the pilot carrier to which the dwell station deflector operating tabs are located the carrier will travel along the top run of the conveyer —1— past the dwell station to the spur conveyer to which it has been directed.

This recirculating process will continue until such time as the rear pilot carrier remaining on the spur gravity conveyer —145— has moved forward off the latch trip arm —151— when the approaching pilot carrier intended for this particular spur conveyer will be deflected thereon in a manner heretofore explained.

The pilot carrier —2— may also be used as a pilot car when desired by placing the tab-actuating pin —7— in one of the holes —6— at the right of the vertical longitudinal center line of the pilot carrier to operate a predetermined double-acting automatic deflector —160— located at intervals along the lower run of the two-way feed belt conveyer, as said carrier is removed from the conveyer —154— and placed upon the lower run of the conveyer —1— and by placing one or more boxes, containers or receptacles containing merchandise upon the lower run of the conveyer —1— a short distance behind said pilot carrier whereupon the pilot carrier and merchandise will be conveyed to the selected double-acting automatic deflector —160— where the tab-actuating pin —7— will first come in contact with a deflector bar releasing tab —161—, Figures 17, 18, 19 and 20, which is located far enough above the conveyer to permit the free passage of the pilot carrier beneath it, but low enough to be in the path of the pin —7— carried by said pilot carrier.

The tab —161— extends across the conveyer —1— from side to side thereof so as to be in the path of and actuated by the pin —7— regardless in which hole —6— of the carrier it has been placed.

The tab —161— is secured to a horizontal rock shaft —162— mounted in suitable bearings —163— secured to the upper end of two vertical supports —159—. A radial arm —164— is secured to one end of the shaft —162— and is connected by a rod —165— to one arm of a bell-crank-lever —166— pivoted to the frame —167— of the conveyer —1— at —168— while the other arm of the bell-crank-lever —166— is connected by a rod —169— to one arm of a second bell-crank-lever —170— also pivotally connected to the frame —167— at —171— while the other arm of the bell-crank-lever —170— is connected by a link —172— to the lower end of the latch stem —173—, said latch stem being slidably mounted in a bearing —174— secured to the conveyer frame —167— and has a rectangular shaped latch head —175— secured to its upper end, positioned a short distance above the bearing —174—.

The latch is held in its normal up-position in the path of travel of a deflector bar —176— by a spring —177— coiled about the upper portion of the latch stem —173— between the latch head —175— and the bearing —174—.

The deflector bar —176— is positioned a short distance above the conveyer —1— and is secured at its rearward end to a vertical rock shaft —178— mounted near its lower end in a bearing —179— secured to the conveyer frame —167— while the upper end of said shaft is mounted in a bearing —180— fastened to one of the vertical supports —159—. The deflector bar —176— is free to swing across the conveyer —1— about the axis of the shaft —178— from the latch member —175— to a stop bar —181— secured to the opposite side of the conveyer frame —167— to which the latch —175— is positioned.

As the pin —7— engages the tab —161— the latch member —175— will be drawn downwardly by the rotating of the shaft —162— through the medium of the radial arm —164—, rod —165—, bell-crank-lever —166—, rod —169— and the bell-crank-lever —170— and link —172— thereby releasing the deflector bar —176—, if it happens to be locked in its closed position by the latch —175—, and permitting the retracting spring —182— secured at one end to the radial arm —183— fastened to the lower end of the deflector bar shaft —178— to return the deflector bar —176— to its normal open position against the stop bar —181— and thereby making a clear and free passage for the pilot carrier to travel to the deflector bar closing tab —185— located a sufficient distance ahead of the vertical supports —163— to permit the free operation of the deflector bar —176— behind the pilot carrier.

The tab —185— is comparatively narrow in width so as to be actuated only by a pin —7— placed in the hole —6— which is in the same vertical plane as the tab —185— as the pilot carrier passes beneath said tab. The tab —185— is secured to a horizontal rock shaft —186— mounted in bearings —187— fastened by bolts, or otherwise, to the vertical supports —188— secured at their lower ends to the side frames —167— of the conveyer —1—.

A radial arm —189— is secured to one end of the shaft —186— and is connected by a rod —190— to one arm of a bell-crank-lever —191— rotatably mounted on a shaft —192— secured to the lower end of the adjacent vertical support —188— while the other arm is connected by a rod —193— to the radial arm —184— fastened to the deflector bar shaft —178— so that as the tab —185— is actuated by the pin —7— the shaft —186— will be rotated sufficiently to swing the deflector bar —176— from the open position obliquely across the conveyer to the closed position in which position it is locked by the latch member —175— after the pilot carrier has passed ahead of the deflector bar and before the convoy of merchandise has reached it, with the result that the merchandise will be diverted from the lower run of the two-way feed belt conveyer —1— onto a spur gravity conveyer —194— while the pilot carrier continues its travel along the conveyer —1— to the fixed deflector —156— where said pilot carrier is deflected onto the gravity conveyer —157— which deposits said pilot carrier onto the upward booster —158—, thence onto the top run of the two-way feed belt conveyer —1— to be deflected into the first vacant or partially filled dwell station —15—. In case the dwell stations —15— are all filled with pilot carriers said pilot carrier will then recirculate through the conveyer system until a vacancy occurs in one of the dwell stations.

The fixed deflector —156— consists of a deflector bar —196—, Figures 21 and 22, positioned diagonally across the conveyer —1— a short distance above said conveyer and supported at or near its ends by two vertical supports —197— secured at their upper ends to the bar —196— while the lower ends are secured one to each side frame —167— of the lower run of the two-way feed belt conveyer —1—.

Although we have shown and particularly described the preferred embodiment of our invention, we do not wish to be limited to the exact details of construction shown, as various changes may readily be made without departing from the spirit of this invention, as set forth in the appended claims.

We claim:

1. In a conveyer system, a conveyer, a branch conveyer comprising a dwell station leading therefrom and a separate conveyer leading from said dwell station to the main conveyer.

2. In a conveyer system, a conveyer, a branch conveyer comprising a dwell station leading therefrom, a pilot carrier adapted to carry one or more articles, a deflector, means carried by the pilot carrier to actuate the deflector to divert said pilot carrier from the main conveyer into the dwell station having a second conveyer by which the carrier is returned to the main conveyer.

3. In a conveyer system, a conveyer, a branch conveyer comprising a dwell station leading therefrom, a pilot carrier adapted to carry one or more articles, a deflector, and means actuated by the pilot carrier to close the deflector to divert said pilot carrier from the main conveyer into the dwell station, means for bringing the pilot carrier to an at rest position in the dwell station and a second conveyer to which the carrier passes when released by said means and by which the carrier is returned to the main conveyer.

4. In a conveyer system, a conveyer, a branch conveyer comprising a dwell station leading therefrom, a pilot carrier adapted to carry one or more articles, a deflector, and means actuated by the pilot carrier to close the deflector to divert said pilot carrier from the main conveyer into the dwell station, and means actuated by the pilot carrier after it has left the main conveyer to permit the deflector to resume its open position and prevent its movement from such position as long as the pilot carrier is in control thereof.

5. In a conveyer system, a conveyer, a branch conveyer comprising a dwell station leading therefrom, a pilot carrier adapted to carry one or more articles, a deflector, and means actuated by the pilot carrier to close the deflector to divert said pilot carrier from the main conveyer into the dwell station, means for bringing the pilot carrier to an at rest position in the dwell station, means actuated by the rear pilot carrier at rest in the filled dwell station to render the deflector closing mechanism inoperative with the deflector bar remaining in the open position.

6. In a conveyer system, the combination of a main conveyer, a dwell station leading therefrom, a deflector bar, a pilot carrier, means actuated by the pilot carrier to move the deflector bar to the closed position ahead of the pilot carrier to divert said pilot carrier from the main conveyer onto the dwell station, means for holding the pilot carrier at an at rest position in the dwell station, and means actuated by the pilot carrier after it has passed from the main conveyer to return the deflector bar to its open position, which means when actuated by the rear pilot carrier positioned in a dwell station filled with pilot carriers renders the deflector bar closing mechanism inoperative with said deflector bar remaining in the open position.

7. In a conveying apparatus, a conveyer, a branch conveyer comprising a dwell station leading therefrom, a pilot carrier, a deflector, means actuated by the pilot carrier to close said deflector ahead of the pilot carrier so as to deflect said pilot carrier from the main conveyer into the dwell station, means for bringing the pilot carrier to an at rest position in the dwell station, a separate automatic pilot carrier release stop, and means for actuating said release stop.

8. In a conveying apparatus, a conveyer, a branch conveyer comprising a dwell station leading therefrom, a pilot carrier, a deflector, means actuated by the pilot carrier to close said deflector ahead of the pilot carrier so as to deflect said pilot carrier from the main conveyer into the dwell station, and an automatic pilot carrier release stop to hold the pilot carrier at an at rest position in the dwell station.

9. In a conveyer system, a main conveyer, a branch conveyer comprising a dwell station leading therefrom, a parcel carrier, an automatic release stop member positioned in the dwell station to hold the parcel carrier in an at rest position in the dwell station, and means for operating the release stop to release the parcel carrier.

10. In a conveyer system, a main conveyer, a branch conveyer comprising a dwell station leading therefrom, a parcel carrier, an automatic release stop member positioned in the dwell station to hold the parcel carrier in an at rest position in the dwell station, a clutch member to engage and operate the release stop, a clutch operating member located on the main conveyer, means for operating the clutch member to move the clutch into and out of engagement with the release stop member, and means for operating the clutch member to move the release stop into and out of the path of the parcel carrier when the clutch is in engagement with said release stop member.

11. In a conveyer system, a main conveyer, a branch conveyer comprising a dwell station leading therefrom, a parcel carrier, an automatic release stop member positioned in the dwell station to hold the parcel carrier in an at rest position in the dwell station, a clutch member to engage and operate the release stop, a clutch operating member located on the main conveyer, means for operating the clutch member to move the clutch into and out of engagement with the release stop member, a clutch rotating member located on the main conveyer ahead of the clutch operating member, and means for operating the clutch rotating member to move the release stop into and out of the path of the parcel carrier when the clutch is in engagement with said release stop member.

12. In a conveyer system, a main conveyer, a dwell station comprising a gravity conveyer leading from the main conveyer, and a separate belt conveyer leading from the gravity conveyer to the main conveyer, and means for driving the belt conveyer.

13. In a conveyer system, a main conveyer, a dwell station comprising a gravity conveyer leading from the main conveyer and a separate belt conveyer leading from the gravity conveyer to the main conveyer, a parcel carrier, a switch adapted to deflect articles from the main conveyer to the dwell station when the switch is in its closed position, means actuated by the parcel carrier for closing said switch ahead of the parcel carrier to deflect the parcel carrier into the dwell station, a stop located near the foot of the gravity conveyer to bring the parcel carrier to an at rest position, a second stop positioned ahead of the first stop to hold the parcel carrier in position to be fed onto the belt conveyer when released by the first stop, means for operating the second stop to release the parcel carrier, means for feeding the parcel carrier onto the belt conveyer, means for driving the parcel carrier feed, and means for driving said belt conveyer.

14. A conveyer system including a plurality of dwell stations, separate branch conveyers disposed at separate places, a main conveyer adapted to supply articles to any one of the dwell stations and also to any one of said branch conveyers, a pilot carrier adapted to carry one or more articles, means actuated by the pilot carrier to divert said pilot carrier from the main conveyer into the first empty or partially filled dwell station, means for conveying the pilot carrier from the dwell station to the main conveyer, means actuated by the pilot carrier for deflecting the pilot carrier from the main conveyer onto a selected branch conveyer.

15. In a conveyer system a main conveyer, a plurality of dwell stations leading from the main conveyer for a portion of the length of said main conveyer, a plurality of branch conveyers leading from another portion of the main conveyer, a pilot carrier adapted to carry one or more articles, a plurality of switch mechanisms located along the main conveyer, one for each of said dwell stations, each of the switches being provided with a switch-operating tab overlying approximately one-half of the width of the pilot carrier, and a plurality of switch mechanisms, one for each of the branch conveyers, said switches being provided with switch-operating tabs located over the opposite half of the pilot carrier to which the dwell station switch operating tabs are located, and means provided on said pilot carrier for operating a switch operating tab to close a selected switch before the pilot carrier reaches the selected switch, means for locking said switches in their closed position to deflect the pilot carrier from the main conveyer, and means actuated by the pilot carrier to release the closed switch after the pilot carrier has passed from the main conveyer, and means for returning said switch to its open position.

16. In a conveyer system, a main conveyer, a plurality of dwell stations leading from the main conveyer for a portion of the length of said main conveyer, a plurality of branch conveyers leading from another portion of the main conveyer, a pilot carrier adapted to carry one or more articles, a plurality of switch mechanisms located along the main conveyer, one for each of said dwell stations, each of the switches being provided with a switch operating tab overlying approximately one-half of the width of the pilot carrier, and a plurality of switch mechanisms, one for each of the branch conveyers, said switches being provided with switch operating tabs located over the opposite half of the pilot carrier to which the dwell station switch operating tabs are located, means provided on said pilot carrier for operating a switch operating tab to close a selected switch before the pilot carrier reaches the selecting switch.

17. In a conveying mechanism comprising a main conveyer, a plurality of dwell stations positioned in staggered relation upon either side of the main conveyer, a plurality of switches adapted to deflect articles from the main conveyer to their respective dwell stations, a pilot carrier, means actuated by the pilot carrier to close their respective switch ahead of the pilot carrier to deflect the pilot carrier into the dwell station, means actuated by the pilot carrier when it enters the dwell station to open the switch, means actuated by the rear pilot carrier in the filled dwell station to hold the switch in its open position, and means for recirculating the pilot carrier through the conveyer system and return the pilot carrier to said dwell station.

18. In a conveying mechanism comprising a main conveyer, a plurality of branch conveyers leading therefrom, a plurality of switches adapted to deflect articles from the main conveyer to their respective branch conveyer, a pilot carrier, means actuated by the pilot carrier to close a selected switch ahead of the pilot carrier to deflect the pilot carrier onto the branch conveyer, means actuated by the pilot carrier when it enters the branch conveyer to open the switch, means actuated by the rear pilot carrier in the filled branch conveyer to hold the switch in its open position, and means for recirculating the pilot carrier through the conveyer system and return the pilot carrier to said branch conveyer.

19. In a conveying system, a conveyer, a branch conveyer leading therefrom, a pilot carrier adapted to act as a pilot car for convoying one or more containers along said conveyer, a deflector, and means actuated by the pilot carrier after said pilot carrier has passed the deflector for closing the deflector.

20. In a conveying system, a conveyer, a branch conveyer leading therefrom, a pilot carrier adapted to act as a pilot car for convoying one or more containers along said conveyer, and means actuated by the pilot carrier after the pilot carrier has passed the branch conveyer to deflect the convoy onto the branch conveyer.

21. In a conveying apparatus, a main conveyer, a branch conveyer leading therefrom, a switch adapted to deflect articles from the main conveyer to the branch conveyer when the switch is in the closed position, a pilot carrier adapted to act as a pilot car, and means actuated by the pilot carrier for opening said switch before the pilot carrier reaches the branch conveyer, and additional means actuated by the pilot carrier for closing a selected switch after said pilot carrier has passed the branch track.

22. In a conveying system, a main conveyer, a branch conveyer leading therefrom, a second branch conveyer also leading from the main conveyer, a pilot carrier adapted to act as a pilot car for convoying one or more articles along the main conveyer, a deflector, means actuated by the pilot carrier after the pilot carrier has passed the deflector for closing the deflector, a switch, and means actuated by the pilot carrier to close the switch before the pilot carrier has reached the second branch conveyer to divert the pilot carrier from the main conveyer onto the second branch conveyer.

23. In a conveying apparatus, a main conveyer, a branch conveyer leading therefrom, a branch conveyer comprising a dwell station leading from the main conveyer, a pilot carrier adapted to carry one or more articles and also to convoy one or more containers, means actuated by the pilot carrier after the pilot carrier has passed the branch conveyer for deflecting the convoy onto the branch conveyer, and means actuated by the pilot carrier before the pilot carrier reaches the dwell station to deflect the pilot carrier onto the dwell station.

24. In a conveying system, a main conveyer, a branch conveyer leading therefrom, a switch adapted to deflect articles from the main conveyer onto the branch conveyer when the switch is in its closed position, a branch conveyer comprising a dwell station leading from the main conveyer, a switch adapted to deflect a container from the main conveyer into the dwell station when the switch is in its closed position, a pilot carrier adapted to carry articles as the pilot carrier is conveyed along the main conveyer and also to act as a pilot car to convoy one or more containers, means actuated by the pilot carrier to open the switch before the pilot carrier reaches the branch track, additional means actuated by the pilot carrier to close a selected switch after the pilot carrier has passed the branch track, means actuated by the pilot carrier for closing the deflector before the pilot carrier reaches the dwell station, and means actuated by the pilot carrier after it has entered the dwell station to open the deflector.

25. In a conveying system, a main conveyer, a pilot carrier, a branch conveyer comprising a dwell station, a deflector adapted to deflect articles from the main conveyer into the dwell station when the deflector is in its closed position, said deflector mechanism including a switch operating tab overlying approximately one-half of the width of the pilot carrier, a branch conveyer leading from the main conveyer, a switch adapted to deflect articles from the main conveyer onto the branch conveyer, said switch mechanism including a switch operating tab positioned over the other half of the pilot carrier, a second branch conveyer leading from the main conveyer, a deflector adapted to deflect articles from the main conveyer onto the second branch conveyer, said deflector mechanism including a switch-operating tab overlying substantially the whole of the width of the pilot carrier.

26. In a conveying apparatus embodying a plurality of separate conveyers, means for selectively supplying articles to any one of said conveyers comprising a main conveyer, a plurality of switch mechanisms located on said main conveyer, a pilot carrier adapted to be used as a pilot car movable along said main conveyer and having means for closing a portion of said switch mechanisms and for opening the remaining portion, one of said switch mechanisms including a switch-operating tab overlying approximately one-half of the width of the pilot carrier, and another of said switch mechanisms including a switch operating tab positioned over the other half of the pilot carrier, and another switch operating mechanism including a tab overlying practically the entire width of the pilot carrier.

27. In a conveying apparatus embodying a plurality of separate conveyers, means for selectively supplying articles to any one of said conveyers comprising a main conveyer, a plurality of switch mechanisms located on said main conveyer, a pilot carrier adapted to be used as a pilot car movable along said main conveyer and having means for closing and opening said switch mechanisms, one of the switch mechanisms including a switch operating tab overlying approximately one-half of the width of the pilot carrier and another of said switch mechanisms including a switch operating tab positioned over the other half of the pilot carrier, and another switch operating mechanism including a tab overlying practically the entire width of the pilot carrier, and a second switch operating tab positioned over one-half of the width of the pilot carrier.

28. In a conveying apparatus embodying a plurality of separate conveyers, means for selectively supplying articles to any one of said conveyers comprising a main conveyer, a plurality of switch mechanisms located on said main conveyer, a pilot carrier adapted to be used as a pilot car movable along said main conveyer and having means for closing and opening said switch mechanisms, one of the switch mechanisms including a switch operating tab overlying approximately one-half of the width of the pilot carrier, and a second switch operating means located at one side of the main conveyer, and another switch operating mechanism including a switch operating tab positioned over the other half of the pilot carrier, and a second switch operating means located at one side of the main conveyer, and another switch operating mechanism including a tab overlying practically the entire width of the pilot carrier and a second switch operating tab positioned over one-half of the width of the pilot carrier.

29. An apparatus of the class described, comprising a main conveyer, a plurality of branch conveyers leading therefrom, deflecting mechanisms on said main conveyer for diverting articles therefrom onto the branch conveyers, means permitting said deflecting mechanisms to remain normally in the position in which they are left by the passage of an article-carrying member, and means on said member for moving into non-deflecting positions all deflectors that are in deflecting position, except a selected one, and for moving that one into deflecting position if at the time it is in non-deflecting position.

30. In a conveyer system, a main conveyer, a dwell station, to which articles on the main conveyer are deflected, a second conveyer by which the articles are returned to the main conveyer and means operated by carriers on the main conveyer for preventing the carriers delivered by the second conveyer onto the main conveyer from colliding with the carriers thereon.

31. In a conveyer system, a main conveyer, a dwell station, to which articles on the main conveyer are deflected, a second conveyer by which the articles are returned to the main conveyer and means actuated by each carrier on the main conveyer for permitting the delivery of a carrier thereto by the second conveyer.

32. In a conveyer system, a main conveyer, a dwell station, to which articles on the main conveyer are deflected, a second conveyer by which the articles are returned to the main conveyer means actuated by each carrier on the main conveyer for permitting the delivery of a carrier thereto by the second conveyer and means also actuated by each carrier on the main conveyer which means prevent such delivery.

33. In a conveyer system, a main conveyer, a dwell station, to which articles on the main conveyer are deflected, a second conveyer by which the articles are returned to the main conveyer, a movable stop which in one position prevents the carriers from entering the second conveyer, means actuated by each carrier on the main conveyer, and mechanism operated by said means for moving the stop out of such position.

34. In a conveyer system, a main conveyer, a dwell station, to which articles on the main conveyer are deflected, a second conveyer by which the articles are returned to the main conveyer, a movable stop which in one position prevents the carriers from entering the second conveyer, means actuated by each carrier on the main conveyer, mechanism operated by said means for moving the stop out of such position and other means actuated by each carrier on the main conveyer which means when so actuated prevent the operation of such mechanism.

35. In a conveyer system, a main conveyer, a dwell station, to which articles on the main conveyer are deflected, a second conveyer by which the articles are returned to the main conveyer, a movable stop which in one position prevents the carriers from entering the second conveyer, means actuated by each carrier on the main conveyer, mechanism operated by said means for moving the stop out of such position and other means actuated by each carrier on the main conveyer which means when so actuated prevent such movement of the stop.

36. In a conveyer system, a main conveyer, a dwell station, a movable deflector bar, which when closed deflects articles from the main conveyer to the dwell station, a trip actuated by certain carriers, mechanism operated by said trip when actuated for closing said deflector bar and means actuated when the dwell station is full for preventing the operation of said mechanism whereby any actuation of the trip is ineffective and the bar remains in the open position.

37. In a conveyer system, a main conveyer, a dwell station, a movable deflector bar, which when closed deflects articles from the main conveyer to the dwell station, a trip actuated by certain carriers, mechanism operated by said trip when actuated for closing said deflector bar and means actuated by each carrier entering the dwell station for preventing the operation of such mechanism whereby any actuation of the trip is ineffective and the bar remains in the open position.

In witness whereof we have hereunto set our hands this 20th day of February, 1928.

JAMES T. COWLEY.
LAVONT C. ALLEN.